(12) United States Patent
Mayorski et al.

(10) Patent No.: US 12,072,876 B2
(45) Date of Patent: Aug. 27, 2024

(54) CONNECTING REAL-TIME DATA SETS TO HISTORICAL DATA

(71) Applicant: VMware LLC, Palo Alto, CA (US)

(72) Inventors: Ilya Mayorski, Sofia (BG); Ivo Petkov, Sofia (BG); Militsa Arnaudova, Sofia (BG); Kristiyan Yankov, Sofia (BG); Dobromir Ivanov, Sofia (BG)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/664,053

(22) Filed: May 19, 2022

(65) Prior Publication Data

US 2023/0376481 A1 Nov. 23, 2023

(51) Int. Cl.
| | | |
|---|---|---|
| *G06F 16/00* | (2019.01) | |
| *G06F 16/21* | (2019.01) | |
| *G06F 16/242* | (2019.01) | |
| *G06F 16/2457* | (2019.01) | |
| *G06F 16/248* | (2019.01) | |

(52) U.S. Cl.
CPC ........ *G06F 16/2448* (2019.01); *G06F 16/211* (2019.01); *G06F 16/2457* (2019.01); *G06F 16/248* (2019.01)

(58) Field of Classification Search
CPC .. G06F 16/244; G06F 16/211; G06F 16/2457; G06F 16/248
USPC .................................................. 707/600–899
See application file for complete search history.

(56) References Cited

U.S. PATENT DOCUMENTS

| | | | | |
|---|---|---|---|---|
| 2014/0095525 | A1* | 4/2014 | Hsiao | G06F 16/2456 |
| | | | | 707/759 |
| 2018/0165306 | A1* | 6/2018 | Cardarette | G06F 16/211 |
| 2018/0165307 | A1* | 6/2018 | Cadarette | G06F 16/2455 |
| 2019/0018899 | A1* | 1/2019 | Podgorny | G06F 16/9038 |
| 2019/0147366 | A1* | 5/2019 | Sankaran | G06N 20/00 |
| | | | | 706/12 |
| 2021/0311944 | A1* | 10/2021 | Park | G06F 16/24542 |
| 2022/0100726 | A1* | 3/2022 | Zhao | G06F 16/2272 |
| 2022/0358160 | A1* | 11/2022 | Alonso | G06F 16/2282 |

* cited by examiner

*Primary Examiner* — Michelle N Owyang
(74) *Attorney, Agent, or Firm* — Kim & Stewart LLP

(57) ABSTRACT

Examples of generating a result set from a data lake based upon a real-time data set are described. A data lake can be structured across multiple databases or tables that are not necessarily directly linked to one another. A conjunction schema can specify how data can be queried across the data lake. When an incoming real-time data set is obtained, a multi-query can be generated against the data lake by utilizing the conjunction schema.

20 Claims, 4 Drawing Sheets

|  | Index 1 | Index 2 | Index 3 | Index 4 |
|---|---|---|---|---|
| Index 1 | N/A | Index1.Data_Field 1 = Index2.Data_field 1 | Index1.Data_Field 1 = Index2.Data_field 1<br>Index2.Data_field2 = Index3.Data_field1 | Index1.Data_field 2 = Index4.Data_Field 1 |
| Index 2 | Index2.Data_field 1 = Index1.Data_field 1 | N/A | Index2.Data_field2 = Index3.Data_field 1 | Index2.Data_Field 1 = Index1.Data_field 1<br>Index1.Data_field 2 = Index4.Data_Field 1 |
| Index 3 | Index3.Data_field2 = Index2.Data_field1<br>Index2.Data_field1 = Index1.Data_field1 | Index3.Data_field2 = Index2.Data_field1 | N/A | Index3.Data_field2 = Index2.Data_field 1<br>Index2.Data_Field 1 = Index1.Data_field 1<br>Index1.Data_field 2 = Index4.Data_Field 1 |
| Index 4 | Index4.Data_field2 = Index1.Data_field1 | Index4.Data_field2 = Index1.Data_Field1<br>Index1.Data_Field1 = Index2.Data_field 1 | Index4.Data_field 2 = Index1.Data_Field 1<br>Index1.Data_Field 1 = Index2.Data_field1<br>ndex2.Data_field2 = Index3.Data_field1 | N/A |

CONNECTING REAL-TIME DATA SETS TO HISTORICAL DATA

BACKGROUND

Various challenges can arise in the management of enterprise resources using a management service. Access to the capabilities of a device can be managed through the administration of compliance rules defined and enforced by the management service. The proliferation of personal tablet and smartphone devices, for example, has resulted in enterprises permitting their employees and contractors to use their own devices for enterprise purposes. The use of these personal devices can be associated with productivity gains and cost savings. The concept "bring your own device" (BYOD) for access to enterprise computing systems may have met initial resistance due to security concerns, but more and more companies are now looking to incorporate BYOD policies for on-premises and remote workers. This causes enterprises to manage a growing number of different desktop, tablet, and mobile devices, along with various platforms and operating systems available for adoption by users. Many enterprises include employees that work in various locations including a traditional workplace, temporary field workplaces, as well as from home. At the same time, complexity of processes utilized for protecting enterprise resources has increased.

At the same time, while the use of personal devices has increased, the risk of security threats that puts enterprise data at risk continues to grow. Accordingly, the number of real-time decisions that must be made to ensure compliance of devices and users with enterprise policies continues to grow. Additionally, the data types and parameters on which these decisions are based similarly continues to grow. Accordingly, it is infeasible to predict the exact structure in terms of data types and indices of a data warehouse in which user data and client data is stored. Accordingly, real-time decisions are sometimes required to be made based upon historical data stored in a data warehouse that might require multiple queries against the data warehouse to surface the appropriate data to make a real-time decision.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 3 illustrates an example conjunction schema according to various examples described herein.

DETAILED DESCRIPTION

The present disclosure relates to generation a workflow platform that can relate real-time data to historical data, where the real-time data sets and the historical data have potentially heterogeneous data types. Relating real-time data to historical data can facilitate real-time decision making for enterprise device management, which can be useful to make enforce compliance policies that are established by the enterprise to manage devices that are enrolled with a management service. Many enterprises allow employees to work in various locations including traditional workplaces, temporary or field workplaces, as well as from home. At the same time, complexity of processes utilized for protecting enterprise resources has increased, which results in rich data sets being provided to a management service tasked with enforcing rules and policies. The data obtained from a population of managed devices must be correlated or cross-referenced to a historical data set so that the management service can make real-time decisions.

For example, the management service might have to enforce a policy that forbids installation of a particular app on a managed device that belongs to a user in a certain user group. Accordingly, the management service can enroll a user and the user's device, which results in a notification that a new user has been added. Therefore, when the notification arrives, the management service can evaluate Other systems are used to query large amounts of data and utilize significant hardware resources, but these systems are often unable to execute parallel queries. Additionally, certain data sets are real-time data and others are historical. Accordingly, systems that are utilized to query large data sets are unable to query against real-time data in parallel with historical data. As an example, real-time threat data is often not stored as historical data, or storing the real-time threat data as historical data can result in stale decision-making.

As a more concrete example, historical data can include device data, application data, user data, and other information stored in a data store that is accessible by the management service. Real-time data can include an alert that specifies information about an application running on a device. The management service might enforce a policy that requires an action to be taken on a user running a particular application. However, the historical data may not directly relate applications to users. Accordingly, examples of the disclosure can generate a multi-query that comprises multiple queries to identify users who have a device running the application. First, the management service can identify all managed devices running the application. Next, the management can identify all users associated with the identified devices.

Figure 1:
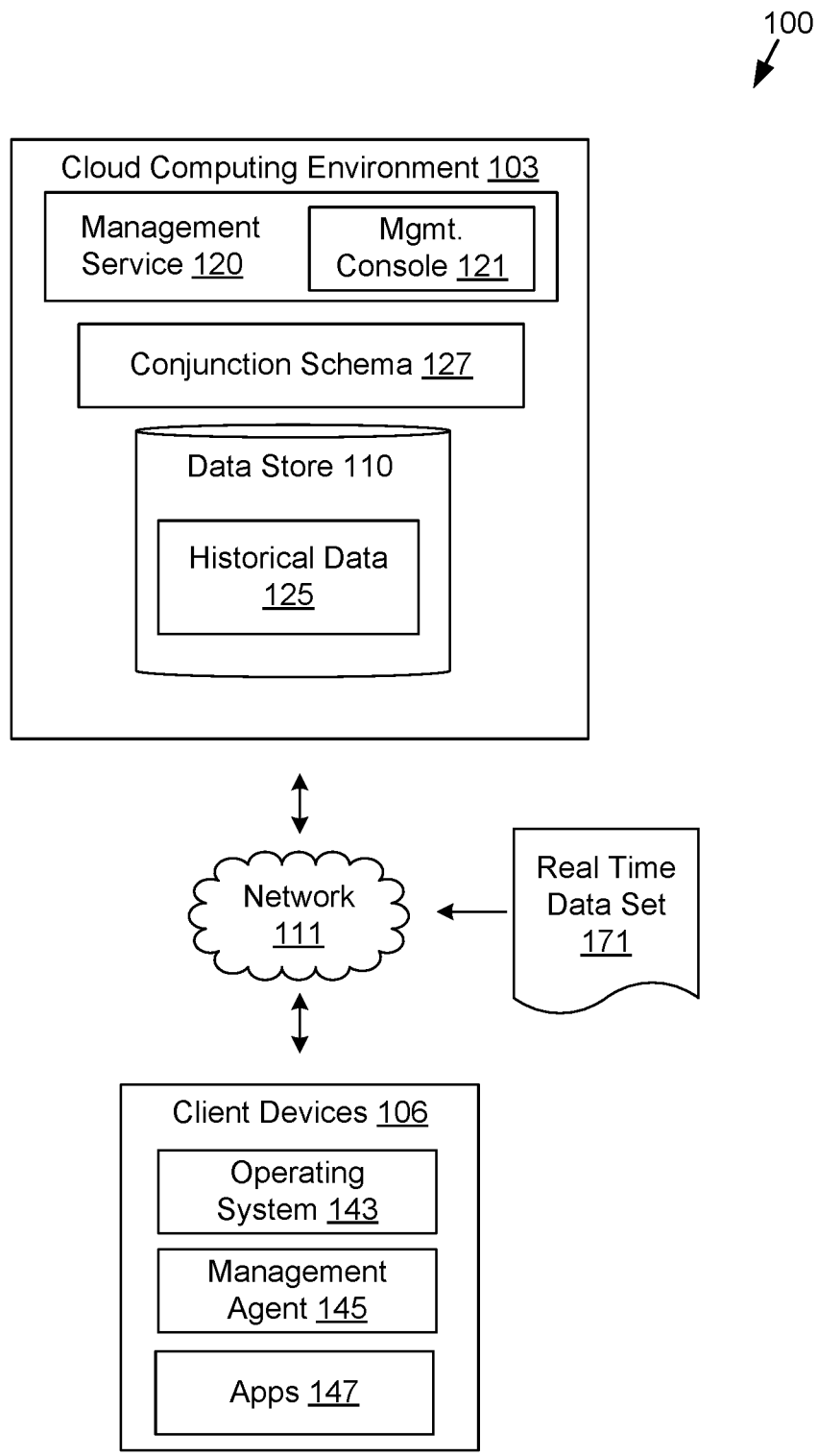
FIG. 1 illustrates an example networked environment according to various examples described herein.

FIG. 1 illustrates an example networked environment 100 according to various examples described herein. The networked environment 100 includes a computing environment 103 and one or more client devices 106 that are in communication using a network 111.

The computing environment 103 can be embodied as one or more computers, computing devices, or computing systems. In certain embodiments, the computing environment 103 can include one or more computing devices arranged, for example, in one or more server or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources varies over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 includes a data store 110. The computing environment 103 can also execute a management service 120. The management service 120 can generate a management console 121 that includes a user interface through which an administrator or other user can manage client devices 106 that are enrolled with the management service 120. The administrator can access the management console 121 using a browser or a special purpose application that communicates with the management console 121.

The data store 110 includes areas in memory for the storage of historical data 125 and other data that can be utilized to operate management service 120, management console 121, or other components of the computing environment 103. The data that facilitates operation of the management service 120 can include device data, application data, user data, data about specific operating system platforms, enterprise locations, and other data that can be leveraged for UEM services. The data store 110 can represent a data lake that stores information about various devices, users, applications, and other resources that can be managed by the management service 120.

Accordingly, the data store 110 can house historical data 125, which can represent information about managed devices, users accounts, applications deployed by the enterprise, physical resources deployed by the enterprise such as printers, displays, buildings, network equipment, or other devices. Historical data 125 can include any data stored in a data lake that the management service 120 might have to query to make real-time decisions about enforcing compliance policies or rules that are specified by information technology administrators.

The management service 120 can operate as a UEM platform that can manage client devices 106 that are enrolled as managed devices with the management service 120. The management service 120 and the management console 121 can be accessible over a public wide area network (WAN) such as the Internet.

Historical data 125 can represent information about client devices 106 that are enrolled as managed devices with the management service 120. The historical data 125 can include a device identifier, certificates associated with the client device 106, a user identifier identifying the user account with which the device is linked, authentication tokens provided to the client device 106, configuration profiles and compliance policies assigned to the client device 106, and other information regarding management of the client device 106 as an enrolled device. The historical data 125 can also include a last-known compliance status associated with a managed client device 106. The compliance status can identify which compliance rules the client device 106 or a user account linked to the client device 106 has violated. For example, the client device 106 may have been taken outside of a specified geofence defined for the client device 106. The historical data 125 can also indicate a device type and a platform of the client device 106. The device type can include desktop-type device, mobile-type device, tablet-type device, and the like. Device type can also refer to a device model or serial number. The platform of the client device 106 can be an indication of an operating system 143 such as Windows® 10, macOS®, iOS®, Android®, as well as other versions of the operating system 143.

Historical data 125 can also include user data, which can represent information about users who have user accounts with the management service 120 or an enterprise that uses the management service 120. These users can also have one or more client devices 106 that are enrolled as managed devices with the management service 120. User data can include authentication data, and information about network services with which the user is assigned an account. The user data can include a user account associates a user identifier and one or more device identifiers for client devices 106.

Historical data 125 can structure information such as user data, device data, application data, and other data into different databases of tables that are indexed or organized by certain data fields. For example, user data can be indexed by user identifier, username, user location, user role, user group, or other data by which users can be identified within an enterprise. User data might also identify devices that are enrolled with the management service 120 with which the user is associated. Device data can be indexed by a device identifier or other identifying information about a client device 106 or any other device for which data can be stored. In some examples, device data can include devices that were formerly managed by the management service 120 but that are now currently unmanaged devices. In some examples, information about unmanaged devices can be kept in a separate table or database within the data lake comprising the historical data 125.

The historical data 125 can also include information about applications that are deployed by the management service 120 to client devices 106. Application data can also include information about applications that are not necessarily deployed by the management service 120 but that are detected as installed client devices 106. Another table in the historical data 125 can also include information about operating system types or operating system versions that are deployed or detected in a population of managed devices.

Historical data 125 can also include information about physical locations, such as offices, conference rooms, offices, and the resources that are associated with or that are located within those physical locations. For example, a physical location can be associated with printers, displays, conference phones, and other devices that can be managed by the management service 120 or unmanaged. Certain types of devices may not have the capability to be managed by the management service 120, but the management service 120 can house information about these devices in the data lake.

The management service 120 can enroll several client devices 106 for mobile device management services. To begin enrollment, the management service 120 can identify and authenticate one of the client devices 106 and store data related to the client device 106 in the historical data 125 for later reference. In some cases, the management service 120 (or a management agent 145, an application 147, or another component executing on the client device 106) can also be registered as a device administrator (at least in part) of the client device 106, permitting the management service 120 to configure and manage certain operating aspects of the client device 106.

Once a client device 106 is enrolled for device management by the management service 120, the management service 120 can provide device management and device monitoring capabilities for an enterprise. The management service 120 can enforce compliance rules or compliance policies by assessing information reported by a management agent 145 to the management service 120. The management service 120 must, in certain cases, make real-time decisions based upon real-time data sets that are obtained from client devices 106 or other data sources. For example, the management service 120 might obtain information about an urgent software update that should be applied to devices running a certain operating system, firmware, or based on another aspect of the device. Accordingly, the management service 120 can identify managed devices that are running the specified operating system and cause a software update to be pushed to these devices.

Historical data 125 can also describe the state of the client device 106, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 120, whether the client device 106 is in a state of compliance with any applicable compliance rules, and whether any remedial actions have been (or are to be) taken as a result of a noncompliance with any applicable compliance rules. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record can include data describing a command queue associated with the client device 106. For example, the management service 120 can maintain a command queue of commands that are designated for execution against the client device 106. As described herein, a client device 106 can be provisioned by the management service 120 by causing resources to be installed or stored on the client device 106. To implement such process, the management service 120 can store a command related to provisioning in the command queue. Additionally, the management service 120 can store a command related to a remedial action associated with a compliance rule in the command queue, in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Historical data 125 can be structured as a data lake in which various information about devices, users, applications, locations, and other information can be stored. As administrators create new policies that the management service 120 needs to enforce that are based on real-time data that was not contemplated when the data lake layout was designed, a mechanism to locate the appropriate managed devices, users, or other resources for which information is stored in the data lake is required. Accordingly, examples of the disclosure can rely on a conjunction schema 127 that can specify how any two data sets or tables within the data lake can be related to one another. For example, assuming a first table in the data lake comprises device data and a second table in the data lake comprises user data, the conjunction schema can specify how a query can be constructed to search the user data when a component of device data is known to the management service 120. Conversely, the conjunction schema can specify how a query can be constructed to search the device data when a component of user data is known to the management service 120. The conjunction schema 127 can be structured as a table with respective entries that specify how to navigate from one table to another table in the data lake. An example of a conjunction schema 127 is discussed in more detail in the context of FIG. 2.

Data describing compliance rules with which the client device 106 must comply can, for instance, specify one or more security policies to which the client device 106 must adhere, a compliance status of the client device 106, and one or more remedial actions that should be performed in the event that an associated rule condition occurs, as described later herein. In some embodiments, the data describing compliance rules and the data describing management policies are obtained from an organizational record associated with an organizational group to which the client device 106 is a member (i.e., the compliance rules associated with the organizational group are reflected in the device record of the member client device 106).

A compliance status of a client device 106 represents whether the device is in compliance with one or more compliance rules. Various compliance rules can be enforced on the client device 106 by the management service 120. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the computing environment 103. Furthermore, a compliance rule in another example can be based upon the time and date matching specified values.

A compliance rule can specify that a client device 106 is required to be powered off or be in a low power "sleep" state during a specified time period. Another compliance rule can specify that a client device 106 is required to be powered on or be in a normal operation "awake" state during a specified time period. As another example, a compliance rule can specify that a client device 106 is prohibited from rendering content that has been designated as confidential. A compliance rule can also specify whether a camera associated with the client device 106 must be enabled or disabled. The compliance rule can also specify certain times of the day, week, or year in which certain hardware or software features are permitted to be enabled or disabled.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to authenticate a user using a password or personal identification number (PIN) in order to unlock the client device 106.

A compliance rule can also require that the client device 106 has device encryption enabled, where data stored on the device is stored in an encrypted form. The data can be encrypted by a device certificate. A compliance rule can also require that the client device 106 be enrolled with the management service 120 as a managed device. Another compliance rule can specify that the user is required to accept the terms of service that are presented by the management component 149 on the client device 106. As another example, a compliance rule can specify that the management component 149 is required to periodically communicate or "check-in" with the management service 120 to report on its status. If a threshold amount of time has elapsed since the previous check-in of the client device 106, the client device 106 can be considered to have violated this compliance rule.

Another compliance rule can specify that a client device 106 run one of a specified variant or version of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

A compliance rule can also identify a list of required applications that must be installed on the client device 106 or a list of forbidden applications that cannot be installed on the client device 106. The management service 120 can instruct the management agent 145 to remove a forbidden application or install a missing required application on the client device 106 in response to detecting a violation of such a compliance rule based on real-time data obtained by the management service 120 regarding the status of managed devices. A compliance rule can also require the presence of a mobile device management (MDM) profile, an MDM storage area, an application profile, and/or a configuration profile. The management component 145 can obtain and store missing required data or containers on the client device 106 in response to detecting a violation of such a compliance rule.

Therefore, the management service 120 can determine a compliance status of a client device 106, which indicates whether and to what extent a particular client device 106 is compliant with compliance rules assigned to the client device 106 by the management service 120. The compliance status can be determined by a management component 145 on the client device 106 that analyzes the status of the client device 106 and reports compliance to the management service 120. In other examples, the compliance status can be determined by the management service 120 based upon real-time data sets received in the management service 120, which can be reported by the management component 145 and from other data sources, such as single sign-on (SSO) systems, network security devices, third party or external data sources, etc.

The management service 120 can also provide a management console 121 as an engine and console interface for device management of the client devices 106. An information technology administrator or user, for example, can view, administer, and update compliance rules and device policies using the management console 121. The administrator can also install applications 147, profiles, certificates, and other components that enable access to network services and enterprise resources. The compliance rules can be collectively administered for several of the client devices 106 by organizing the client devices 106 into several different groups or categories of devices according to organizational, platform, and other factors.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the management service 120 for device management. A management agent 145 can be installed on a client device 106 to locally manage the device using device-driven management workflows 139 that are provided by the management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

The management agent 145 can also have the authority to enable or disable certain hardware features of the client device 106 in response to a command from the management service 120 or. The management agent 145 can also place the device into different hardware modes, such as airplane mode, silent mode, do-not-disturb mode, or other modes supported by the client device 106.

The management agent 145 can perform management actions to alter operation of the client device 106 in response to changes in states that are detected on the client device 106. The management agent 145, in one instance, can periodically poll the operating system 143, a data store, or other software and hardware components of the client device 106 to identify device states and report the same to the management service 120. The reported device states can comprise a real-time data set 171 upon which the management service 120 can act to enforce a compliance policy defined by an administrator.

The management service 120 can take action on client devices 106 or users in response to certain states. Commands can include generating a notification on the client device 106, sending a notification to an administrator or user, changing a non-compliant state to a compliant state, deleting applications 147 and other enterprise resources, ending a SSO session with an identity provider, removing access to enterprise resources, and other management actions on the client device 106. In one example, the management service 120 can detect that the client device 106 is out of compliance with respect to a compliance rule and might instruct the management agent 145 to restrict a hardware feature of the client device 106, delete data from the client device 106, or disable certain applications on the client device 106. The management service 120 can also take other variations of management actions on the client device 106 as directed by the compliance rules and policies enforced by the management service 120.

The management service 120 can take these various actions by making real-time decisions in response to a real-time data set 171 obtained by the management service 120. For example, the real-time data set 171 can identify an aspect of a user, device, application, group, location, or other data type on which the management service 120 might be configured to act. To identify the appropriate users or client devices 106 on which action is required, the management service 120 can generate a multi-query as specified by the conjunction schema 127 to determine which devices, users, groups, or other data fields are needed to carry out a management action. For example, if a real-time data set 171 indicates that users with a certain application installed on their respective devices should be notified, the management service 120, can construct a multi-query that includes a first query to identify devices on which the application is installed from a first table in the historical data 125 and then a second query to identify users associated with the identified devices from a second table. The multi-query can be constructed using guidance from the conjunction schema 127 that maps how data tables in the data lake of the historical data 125 are related to one another.

As part of the enrollment process, the management service 120 and/or management agent 145 can be registered as a device administrator of the client device 106, permitting the management service 120 and/or management agent 145 to manage certain operating aspects of the client device 106. In either case, the management service 120 can remotely configure the client device 106 by interacting with the management agent 145. The management service 120 can also indicate various applications 147 and software components to install on the client device 106. Such software components can include, for example, applications, resources, libraries, drivers, device configurations, or other related components. The management service 120 can also indicate network locations where the software components can be downloaded for installation. The management service 120 can also indicate to download and install compliance rules and instruct the management agent 145 and the operating system 143 of the client device 106 to enforce the compliance rules.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the computing environment 103, the network service 109, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real-time streaming protocol (RTSP), real-time messaging protocol (RTMP), user datagram protocol (UDP), internet protocol (IP), transmission control protocol (TCP), other protocols and interconnect frameworks, and combinations thereof.

Figure 2:
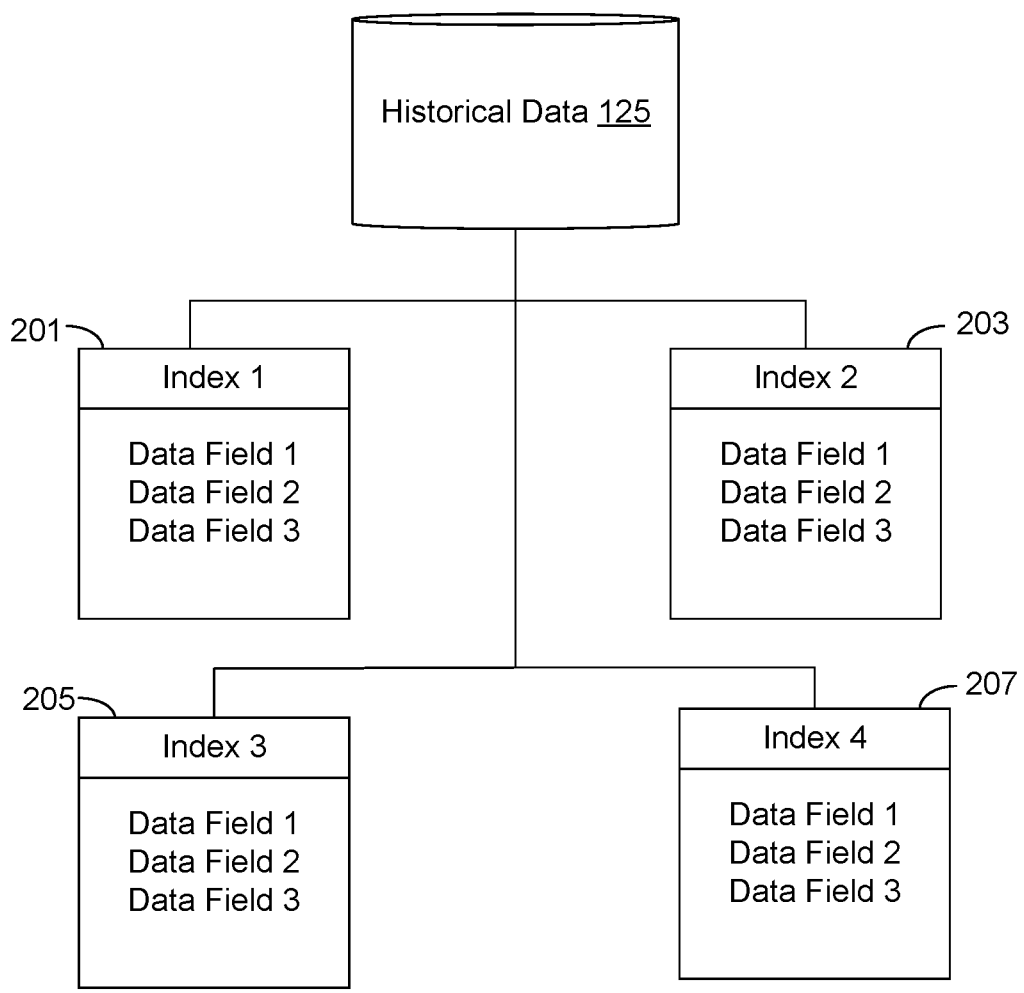
FIG. 2 illustrates an example data layout of a data store in an example networked environment according to various examples described herein.

Referring next to FIG. 2, shown is an example of a data lake, or historical data 125, that can house data utilized by the management service 120 to identify users, applications, devices, locations, user groups, or any other data that needs to be correlated to a real-time data set 171 to make real-time decisions according to examples of the disclosure. The example is presented to illustrate how data can be stored in a data lake in various tables or databases that might contain heterogeneous data.

In one example, index 201 can comprise a table of device data, index 203 can comprise a table of user data, index 205 can comprise a table of application data, and index 207 can comprise a table of operating system data. Accordingly, each of the tables can have different data fields that represent historical data 125 upon which decisions can be made in response to a real-time data set 171 obtained by the management service 120. The real-time data set 171 can be obtained from users or devices within the enterprise or from external data sources, such as a third party threat monitoring system, an alert from an anti-virus, device, or operating system vendor, from an IT administrator, or any other data source that causes the management service 120 to have to identify users, devices, or other entities associated with an enterprise.

The data fields can correspond to the data types that are stored in a particular table. For example, the data fields for device data can represent data types for which values are stored in a respective table. These data types can include a device identifier, a device manufacturer, a device UUID, FCC identifier, etc. In the case of user data, these data types might include a user identifier, username, user group identifier, user location, user role within an organization, etc. In the case of application data, these data types might include application name, application version, application identifier, etc. In the case of operating system data, these data types can include an operating system name, operating system version, operating system type, etc.

A real-time data set 171 can also include data that has data types. The data types of data in the real-time data set 171 can vary from data types associated with the data lake in which the historical data 125 is stored. The management service 120 may have to locate data within a particular table in the data lake that corresponds to data types in the real-time data set 171. However, the data types in the real-time data set 171 may require multiple queries across multiple tables. Accordingly, the conjunction schema 127 can facilitate construction of such a multi-query by the management service 120 or any other service utilizing the data lake.

FIG. 3 illustrates an example of a conjunction schema 127 according to various examples of the disclosure. The conjunction schema 127 can correspond to the data lake layout of the historical data 125 identified in FIG. 2. The conjunction schema 127 can be defined by an administrator of the data lake corresponding to the historical data 125. Each cell of conjunction schema 127 can specify how to identify a particular item in a table in the data lake of the historical data 125.

For example, the real-time data set 171 upon which the management service 120 is required to make a real-time decision may contain a data type that corresponds to Index 1 in the data lake. The management service 120, to act on the real-time data set 171, may have to identify one or more items matching the data corresponding to the data type in Index 3. Accordingly, management service 120 can consult the conjunction schema 127 by obtaining the cell denoted by the row corresponding to Index 1 and the column corresponding to Index 3, which specifies that "Index1.Data_Field1=Index2.Data_field1; Index2.Data_field2=Index3.Data_field1."

In order words, the conjunction schema 127 cell explains that the management service 120 can locate items in Index 3 by first querying Index 2 to obtain items matching Datafield1 from Index 1. Next, the management service 120 can query Index 2 to obtain items matching Data_field2 in Index 2 to obtain items matching Data_field1 in Index 3. In this way, the management service 120 has constructed a multiquery to navigate from a data table Index 1 to data table Index 3.

As another example, suppose that the real-time data set 171 includes a data type corresponding to one that is found in Index 2. Suppose further that the real-time data set 171 includes information that requires the management service 120 to locate entries found in Index 1. Accordingly, the management service 120 can consult the conjunction schema 127 to determine how to construct a query to identify items in Index 1 from information that is found only in Index 2. In the example conjunction schema 127 shown in FIG. 2, the management service 120 can construct a query corresponding to "Index2.Data_field 1=Index1.Data_field 1." Accordingly, the management service 120 can query Index 2 to obtain items matching Data_field1 to obtain items matching Data_field1 in Index 1. In this way, the management service 120 has constructed a multi-query to navigate from a data table Index 2 to data table Index 1.

Figure 4:
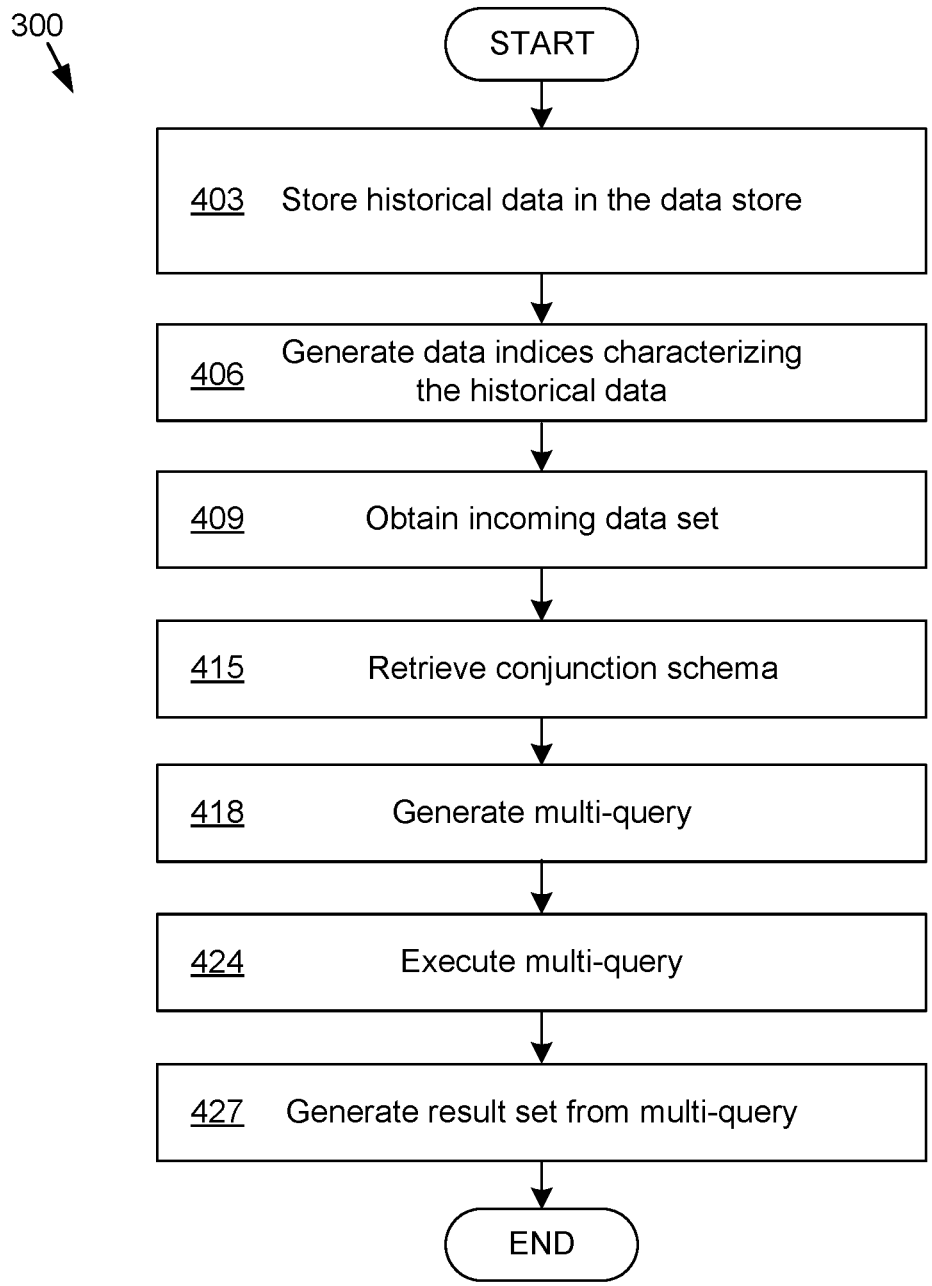
FIG. 4 illustrates a flowchart depicting a method according to various examples described herein.

With this context, reference is now made to FIG. 4. FIG. 4 shows a flowchart 400 performed by components of the networked environment 100. Specifically, the flowchart 400 describes how the management service 120 can utilize a data lake, or historical data 124 and a corresponding conjunction schema 127 to generate multi-queries to correlate real-time data with information stored in the historical data 124. This can allow the management service 120 to make real-time decisions based on a real-time data set 171 that requires the management service 120 to locate entries within the historical data 124 on which action should be taken. While the flowchart 400 is described as performed by the management service 120, it can also be considered functionality performed by the management console 121. Certain functionality described for the flowchart 400 can also be performed by other components of the networked environment 100. Segmentation and ordering indicated in the flowchart 400 is for example purposes only. The functionality described for a particular step can be performed in any order relative to the other steps described.

At step 403, the management service 120 can store historical data corresponding to data points like users, managed devices, applications deployed within an enterprise, and other data points into historical data 124. The historical data 124 can be implemented as a data lake in which data can be stored in various tables, databases, or other data.

At step 406, the management service 120 can generate data indices that characterize the historical data 125. The data indices can comprise the conjunction schema 127. The conjunction schema 127 can characterize the historical data 124 by providing a roadmap from which the management service 120, or any other service needing to query the data lake, can generate one or more queries to identify an item in a table from the data lake.

At step 409, the management service 120 can obtain a real-time data set 171. The real-time data set 171 represents one or more data points from which a real-time decision must be made by the management service 120. For example, the real-time decision can comprise a decision to take an action on a managed device, alert a user, alert an administrator, take an action on a user account, etc.

At step 415, the management service 120 can retrieve the conjunction schema 127 corresponding to the historical data 125. The conjunction schema 127 can specify how any two data sets or tables within the data lake can be related to one another. For example, assuming a first table in the data lake comprises device data and a second table in the data lake comprises user data, the conjunction schema can specify how a query can be constructed to search the user data when a component of device data is known to the management service 120. Conversely, the conjunction schema can specify how a query can be constructed to search the device data when a component of user data is known to the management service 120. The conjunction schema 127 can be structured as a table with respective entries that specify how to navigate from one table to another table in the data lake.

At step 418, the management service 120 can generate a multi-query to identify the desired items from a table or index within the historical data 125. As noted above in the description of FIGS. 2-3, the conjunction schema 127 can specify how one or more queries can be constructed to obtain items of a particular data type from a table in the data lake given a starting data type that may be present in a different table from the data lake.

At step 424, the management service 120 can execute the multi-query. In the event that the multi-query includes multiple queries, a first query can be executed to obtain a result set from the first table or index identified by the conjunction schema 127. Using the result set from the first table or index identified by the conjunction schema 127, the management service 120 can then construct and execute a second query to obtain another result set from a second table or index identified by the conjunction schema 127, and so on.

At step 427, the management service 120 can generate a result set from the multi-query constructed using the conjunction schema 127. Once the result set is obtained, the management service 120 can make a real-time decision based on the real-time data set 171. Generating the result set can include generating a cartesian product data set that represents one or more items from the historical data 124 that matches one or more data types associated with the real-time data set 171. The cartesian product set cam be generated in response to the multi-query that generates multiple results from the historical data that match a plurality of data types associated with the incoming data sets.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

Therefore, the following is claimed:

1. A method, comprising:
    storing, by a management service, historical data in a data store, the historical data associated with a plurality of users and a plurality of devices, wherein the plurality of devices are enrolled as managed devices with the management service;
    obtaining, by the management service, an incoming data set associated with a real-time decision;
    retrieving, by the management service, a conjunction schema associated with the historical data, the conjunction schema defining a mapping between a plurality of data types associated with the incoming data set to a plurality of data types for the historical data, wherein the conjunction schema maps a relationship between a plurality of data sets in a data lake that are related to one another;
    generating, by the management service, a multi-query based upon the conjunction schema specifying the mapping between the data types associated with the incoming data set and the data types for the historical data, the multi-query comprising a first query from a first one of the plurality of data sets of one of the incoming data set or the historical data to obtain a first result, and a second query from a second one of the plurality of data sets of the other of the historical data or incoming data set of which the first one of the plurality of data sets is not a part, to obtain a second result, wherein the second query is constructed using the first result based, at least in part, on the conjunction schema, wherein the conjunction schema specifies how the second query is constructed using the first result;
    executing, by the management service, the multi-query; and
    generating, by the management service, a result set from the multi-query that specifies one or more results in the historical data that corresponds to the incoming data set.

2. The method of claim 1, wherein the conjunction schema maps a data type in the incoming data set to a corresponding data type in the historical data.

3. The method of claim 1, wherein the multi-query comprises a plurality of queries on the historical data that are required to obtain the result set from the historical data.

4. The method of claim 1, wherein the incoming data set identifies an aspect of a population of devices managed by the management service and the multi-query comprises at least one query mapping the aspect of the population of devices to a particular data type associated with the historical data.

5. The method of claim 1, wherein the incoming data set identifies an aspect of a user associated with the management service and the multi-query comprises at least one query mapping the aspect of the user to a particular data type associated with the historical data.

6. The method of claim 1, wherein generating the result set further comprises generating a cartesian product data set that represents one or more items from the historical data that matches one or more data types associated with the incoming data set.

7. The method of claim 6, wherein the cartesian product set is generated in response to the multi-query generating a plurality of results from the historical data that match a plurality of data types associated with the incoming data sets.

8. A non-transitory computer-readable medium embodying instructions executable by at least one computing device, the instructions, when executed, causing the at least one computing device to at least:
store, by a management service, historical data in a data store, the historical data associated with a plurality of users and a plurality of devices, wherein the plurality of devices are enrolled as managed devices with the management service;
obtain, by the management service, an incoming data set associated with a real-time decision;
retrieve, by the management service, a conjunction schema associated with the historical data, the conjunction schema defining a mapping between a plurality of data types associated with the incoming data set to a plurality of data types for the historical data, wherein the conjunction schema maps a relationship between a plurality of data sets in a data lake that are related to one another;
generate, by the management service, a multi-query based upon the conjunction schema specifying the mapping between the data types associated with the incoming data set and the data types for the historical data, the multi-query comprising a first query from a first one of the plurality of data sets of one of the incoming data set or historical data to obtain a first result, and a second query from a second one of the plurality of data sets of the other of the historical data or incoming data set of which the first one of the plurality of data sets is not a part, to obtain a second result, wherein the second query is constructed using the first result based, at least in part, on the conjunction schema, wherein the conjunction schema specifies how the second query is constructed using the first result;
execute, by the management service, the multi-query; and
generate, by the management service, a result set from the multi-query that specifies one or more results in the historical data that corresponds to the incoming data set.

9. The non-transitory computer-readable medium of claim 8, wherein the conjunction schema maps a data type in the incoming data set to a corresponding data type in the historical data.

10. The non-transitory computer-readable medium of claim 8, wherein the multi-query comprises a plurality of queries on the historical data that are required to obtain the result set from the historical data.

11. The non-transitory computer-readable medium of claim 8, wherein the incoming data set identifies an aspect of a population of devices managed by the management service and the multi-query comprises at least one query mapping the aspect of the population of devices to a particular data type associated with the historical data.

12. The non-transitory computer-readable medium of claim 8, wherein the incoming data set identifies an aspect of a user associated with the management service and the multi-query comprises at least one query mapping the aspect of the user to a particular data type associated with the historical data.

13. The non-transitory computer-readable medium of claim 8, wherein generating the result set further comprises generating a cartesian product data set that represents one or more items from the historical data that matches one or more data types associated with the incoming data set.

14. The non-transitory computer-readable medium of claim 13, wherein the cartesian product set is generated in response to the multi-query generating a plurality of results from the historical data that match a plurality of data types associated with the incoming data sets.

15. A system, comprising:
at least one computing device comprising a hardware processor; and
instructions accessible by the hardware processor of the at least one computing device, wherein the instructions are executed causing the at least one computing device to at least:
store, by a management service, historical data in a data store, the historical data associated with a plurality of users and a plurality of devices, wherein the plurality of devices are enrolled as managed devices with the management service;
obtain, by the management service, an incoming data set associated with a real-time decision;
retrieve, by the management service, a conjunction schema associated with the historical data, the conjunction schema defining a mapping between a plurality of data types associated with the incoming data set to a plurality of data types for the historical data, wherein the conjunction schema maps a relationship between a plurality of data sets in a data lake that are related to one another;
generate, by the management service, a multi-query based upon the conjunction schema specifying the mapping between the data types associated with the incoming data set and the data types for the historical data, the multi-query comprising a first query from a first one of the plurality of data sets to obtain a first result associated with the incoming data set and a second query from a second one of the plurality of data sets associated with the historical data to obtain a second result, wherein the second query is constructed using the first result based, at least in part, on the conjunction schema, wherein the conjunction schema specifies how the second query is constructed using the first result;
execute, by the management service, the multi-query; and
generate, by the management service, a result set from the multi-query that specifies one or more results in the historical data that corresponds to the incoming data set.

16. The system of claim 15, wherein the conjunction schema maps a data type in the incoming data set to a corresponding data type in the historical data.

17. The system of claim 15, wherein the multi-query comprises a plurality of queries on the historical data that are required to obtain the result set from the historical data.

18. The system of claim 15, wherein the incoming data set identifies an aspect of a population of devices managed by the management service and the multi-query comprises at least one query mapping the aspect of the population of devices to a particular data type associated with the historical data.

19. The system of claim 15, wherein the incoming data set identifies an aspect of a user associated with the management service and the multi-query comprises at least one query mapping the aspect of the user to a particular data type associated with the historical data.

20. The system of claim 15, wherein generating the result set further comprises generating a cartesian product data set that represents one or more items from the historical data that matches one or more data types associated with the incoming data set.

\* \* \* \* \*